United States Patent
Kong et al.

(10) Patent No.: US 10,946,833 B2
(45) Date of Patent: Mar. 16, 2021

(54) ACCESS DEVICE LOCALIZATION

(71) Applicants: VOLKSWAGEN AKTIENGESELLSCHAFT, Wolfsburg (DE); AUDI AG, Ingolstadt (DE); PORSCHE AG, Stuttgart (DE)

(72) Inventors: Liang Kong, Santa Clara, CA (US); Oleg Tolstov, San Carlos, CA (US); Mehdi Golestanian, Notre Dame, IN (US); Maximilian Thum, Foster City, CA (US)

(73) Assignees: Volkswagen AG; Audi AG; Porsche AG

( * ) Notice: Subject to any disclaimer, the term of this patent is extended or adjusted under 35 U.S.C. 154(b) by 0 days.

(21) Appl. No.: 16/450,175

(22) Filed: Jun. 24, 2019

(65) Prior Publication Data
US 2020/0398787 A1 Dec. 24, 2020

(51) Int. Cl.
*B60R 25/00* (2013.01)
*B60R 25/24* (2013.01)

(52) U.S. Cl.
CPC ........ *B60R 25/24* (2013.01); *B60R 2325/205* (2013.01)

(58) Field of Classification Search
CPC ...... G07C 9/00309; G07C 2009/00793; G07C 2209/63; G07C 9/00182; G07C 9/00944; G07C 9/28; G07C 2209/64; G07C 2209/65; G07C 9/30; G07C 2009/00555; B60R 25/24; B60R 2325/205
USPC ...................................................... 340/5.72
See application file for complete search history.

(56) References Cited

U.S. PATENT DOCUMENTS

| | | | |
|---|---|---|---|
| 8,427,289 B2 * | 4/2013 | Ghabra | B60R 25/24 340/426.36 |
| 9,894,492 B1 * | 2/2018 | Elangovan | H04W 4/023 |
| 10,168,415 B2 * | 1/2019 | Kanaga | G01S 11/06 |
| 10,285,013 B2 * | 5/2019 | Ledvina | B60R 25/24 |
| 10,688,965 B2 * | 6/2020 | Breer | B60R 25/245 |
| 2011/0148573 A1 * | 6/2011 | Ghabra | B60R 25/245 340/5.61 |
| 2013/0342379 A1 * | 12/2013 | Bauman | G01S 13/0209 342/21 |
| 2014/0129051 A1 * | 5/2014 | Gautama | H04W 4/40 701/2 |
| 2014/0253287 A1 * | 9/2014 | Bauman | B60R 25/00 340/5.61 |
| 2014/0253288 A1 | 9/2014 | O'Brien et al. | |
| 2014/0308971 A1 * | 10/2014 | O'Brien | H04W 4/023 455/456.1 |

(Continued)

FOREIGN PATENT DOCUMENTS

| | | |
|---|---|---|
| DE | 102015208620 A1 | 11/2016 |
| WO | 2018059781 A1 | 4/2018 |
| WO | 2019058985 A1 | 3/2019 |

OTHER PUBLICATIONS

Search Report and Written Opinion fro International Patent Application No. PCT/EP2020/067398; dated Oct. 8, 2020.

*Primary Examiner* — Zhen Y Wu
(74) *Attorney, Agent, or Firm* — Barnes & Thornburg LLP

(57) ABSTRACT

A system and method are provided for determining an optimum location of an access device relative to a motor vehicle. The access device allows entry into the motor vehicle and/or allows activation of systems in the motor vehicle depending on the location of the access device relative to the motor vehicle.

19 Claims, 6 Drawing Sheets

(56) References Cited

U.S. PATENT DOCUMENTS

| | | | |
|---|---|---|---|
| 2017/0203721 A1* | 7/2017 | Hamada | G01S 5/0252 |
| 2017/0361806 A1* | 12/2017 | Scheim | B60R 25/1009 |
| 2018/0106882 A1* | 4/2018 | Kanaga | G01S 11/06 |
| 2018/0120411 A1* | 5/2018 | Hermann | G01S 5/02 |
| 2018/0234797 A1* | 8/2018 | Ledvina | B60R 25/24 |
| 2018/0252796 A1* | 9/2018 | Qu | H04R 1/40 |
| 2019/0241154 A1* | 8/2019 | Elangovan | B60R 25/245 |
| 2019/0248331 A1* | 8/2019 | Salah | B60R 25/209 |
| 2019/0256049 A1* | 8/2019 | Jawany | G07C 9/29 |
| 2019/0346531 A1* | 11/2019 | Apostolos | B60R 25/30 |
| 2020/0082653 A1* | 3/2020 | Hazebrouck | G01S 13/60 |
| 2020/0122686 A1* | 4/2020 | Siswick | B60R 25/246 |
| 2020/0254973 A1* | 8/2020 | Yoshida | G01S 5/0221 |

\* cited by examiner

ACCESS DEVICE LOCALIZATION

BACKGROUND

The present disclosure relates to systems, components, and methodologies for passive keyless systems in motor vehicles. In particular, the present disclosure relates to systems, components, and methodologies for detecting and localizing an access device used in a passive keyless system for entry and activation of systems in a motor vehicle.

SUMMARY

A motor vehicle may include a body a plurality of operating systems for controlling operation of the motor vehicle. The body may define an interior of the motor vehicle with an exterior region surrounding the body. Access-control means may be provided for locating an access device relative to the motor vehicle. Activation of one or more of the operating systems may be allowed in response to a determined location of the access device being within a predetermined region associated with the one or more operating systems.

In some embodiments, a plurality of anchors may be distributed along the body in predetermined positions of a coordinate system. Each anchor of the plurality of anchors may be configured to measure a distance between the respective anchor and the access device for gathering ranging data of the measured distances from the plurality of anchors. An initial region of interest where the access device is located may be identified based on the ranging data. The initial region of interest may be optimized based on overlapping points in the ranging data. An initial location of the access device may be determined as in the interior or in an exterior region around the motor vehicle based on the optimized region of interest. An optimum location of the access device relative to the motor vehicle in the coordinate system may be determined based on whether the access device is determined to be in the interior or in the exterior region.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Further advantages, features and possibilities of using the present disclosed embodiments emerge from the description below in conjunction with the figures.

FIG. 1 is a diagrammatic top plan view of a motor vehicle in accordance with the present disclosure showing that the motor vehicle includes a body defining an interior and an exterior of the motor vehicle, a plurality of operating systems for controlling operation of the motor vehicle, and an exemplary access-control system and suggesting that activation of the various operating systems is controlled depending on a location of an access device carried by a user relative to the motor vehicle;

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Figure 1:
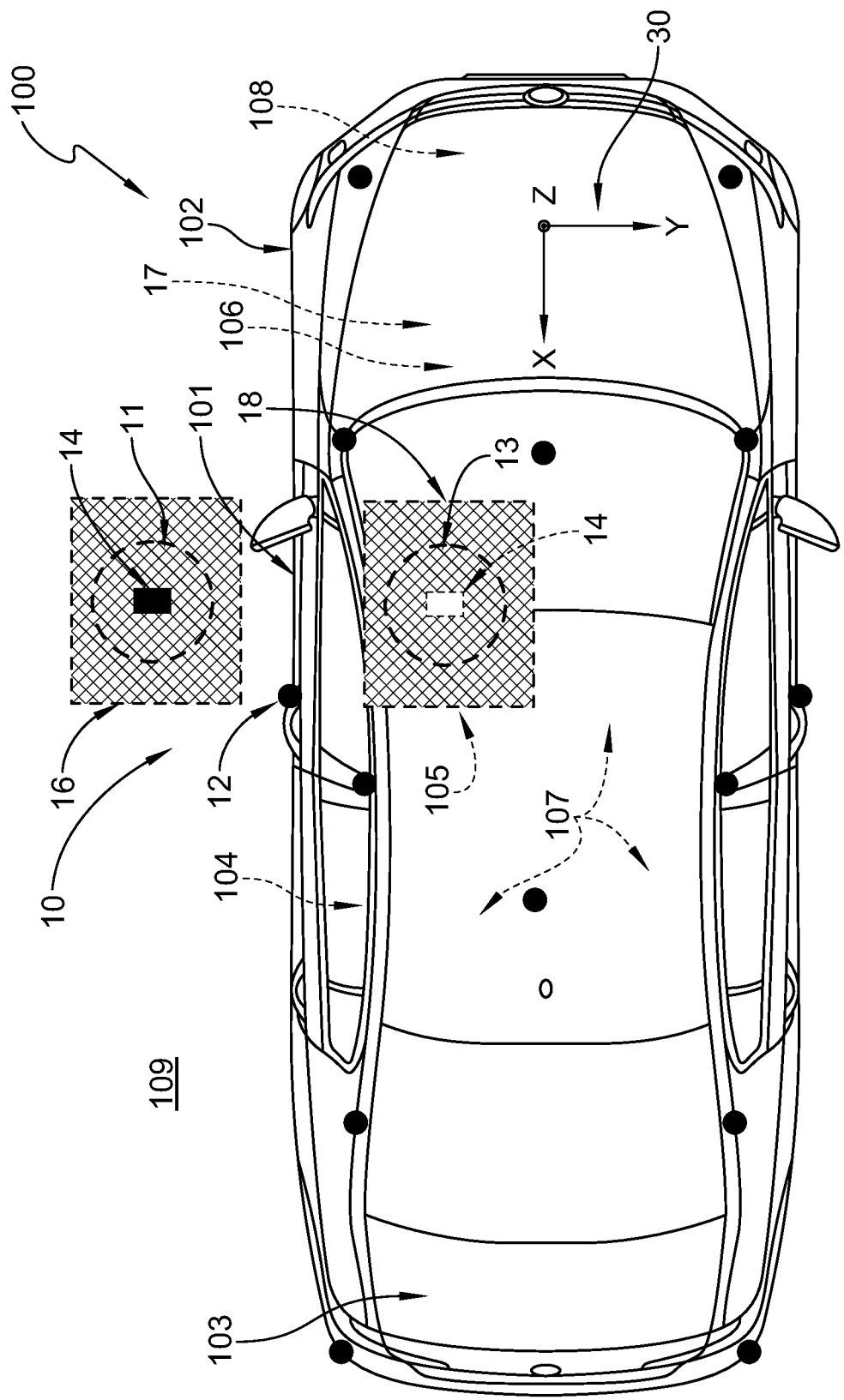

A motor vehicle 100 in accordance with the present disclosure is shown in FIG. 1. The motor vehicle 100 includes a body 102 defining an interior 104 and a plurality of operating systems 106 for activating various functions of the motor vehicle 100 and for controlling operation of the motor vehicle 100. One or more of the operating systems 106 can be used for activating and controlling operation of a drive unit 108 of the motor vehicle 100, such as a gas, electric, and/or hybrid motor(s) for example. The operating systems 106 can be programmed to provide movement functions to the motor vehicle 100, such as auto-parking and autonomous driving among others. The operating systems 106 can also be programmed to provide comfort functions in the motor vehicle 100, such as light, sound, temperature, airflow, and seat configuration among others.

In an illustrative embodiment, the motor vehicle 100 also includes an exemplary access-control system 10 in accordance with the present disclosure used to control access to the various operating systems 106 of the motor vehicle 100 as suggested in FIG. 1. The access-control system 10 includes a plurality of measuring devices or anchors 12 mounted on (or coupled within) the motor vehicle 100 for detecting a location of an access device 14. In some embodiments, the access-control system 10 can operate as a passive keyless system with the access device 14 allowing activation of the operating systems 106 depending on a location of the access device 14 relative to the motor vehicle 100. In some embodiments, the anchors 12 communicate wirelessly with the access device 14 over one or more frequencies, such as Ultra-Wide Band (UWB), for collecting ranging data of the measured distance from the access device 14 to each anchor 12. In some embodiments, the measured distances are determined based on the Time of Flight (ToF), Difference Time of Flight (DToF), Angle of Arrival (AoA), and/or Received Signal Strength (RSS) of signals exchanged between the access device 14 and the anchors 12. In some embodiments, the access-control system 10 is configured to provide two way ranging (TWR) measurements between the anchors 12 and the access control device 14. A controller 17 uses the known positions of the anchors 12 and the collected ranging data to determine a position of the access device 14 relative to the motor vehicle 100, such as through triangulation, trilateration, or multilateration.

In some embodiments, predetermined regions in and around the motor vehicle 100 are defined having one or more predetermined operating systems 106 associated therewith, and activation of the one or more operating systems 106 is allowed in response to the access device 14 being located in the associated region as suggested in FIG. 1. In some embodiments, a relative location of the access device 14 to the motor vehicle 100 can dictate which functions of the motor vehicle 100 are available for activation. For example, in some embodiments, an auto-park function of the motor vehicle 100 can be activated when the access device 14 is located a predefined distance away from the motor vehicle 100 (e.g., about 5 meters). In some embodiments, a door 101 or trunk 103 of the motor vehicle 100 can be opened when the access device 14 is sufficiently close to the motor vehicle (e.g., about 2 meters). In some embodiments, the drive unit 108 of the motor vehicle 100 can be activated when the access device 14 is located in the interior 104 of the motor vehicle 100.

The more precisely the location of the access device 14 can be determined, the more individualized the experience of a driver/passenger of the motor vehicle 100 can be made. For example, a plurality of seating positions, such as a driver's position 105 and passengers' positions 107, are arranged in the interior 104 of the motor vehicle 100. In some embodiments, each driver/passenger of the motor vehicle 100 can have a personal access device (e.g., smartphone, key fob, etc.) and their location relative to the motor vehicle 100 can change the functions of the motor vehicle 100 operating at that location (temperature, airflow, lights, sounds, seat configuration, etc.). Precise location determination of the access device 14 can also improve security and safety, and for compliance with regulations.

In the illustrative embodiment, the anchors 12 are arranged along the body 102 of the motor vehicle 100 in predetermined locations of a coordinate system 30 as shown in FIG. 1. The known locations of the anchors 12 (e.g., by X, Y, Z coordinate in the coordinate system 30) allows for ranging data between the access device 14 and the anchors 12 to be used in determining an optimum location of the access device 14 relative to the motor vehicle 100 (e.g., in the coordinate system 30). Using the ranging data for all of the anchors 12 in determining the location of the access device 14 relative to the motor vehicle 100 can be computationally burdensome and require extensive time and resources to process.

Figure 2:
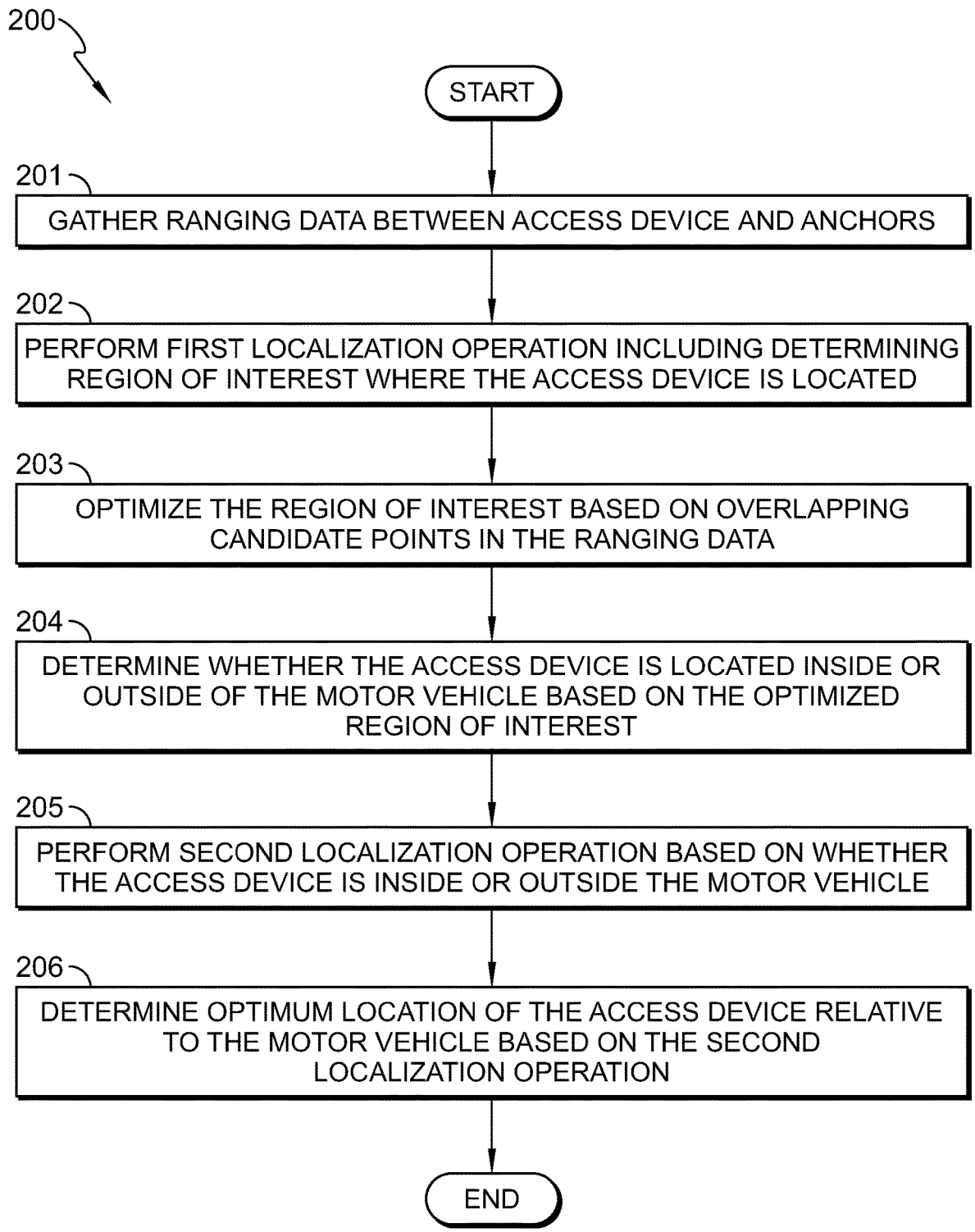
FIG. 2 is a diagrammatic flow chart of an exemplary method in accordance with the present disclosure for determining an optimum location of the access device relative to the motor vehicle.

An exemplary method 200 in accordance with the present disclosure for determining the optimum location of the access device 14 relative to the motor vehicle 100, while minimizing the computational resources required and maximizing accuracy, is shown in FIG. 2. The method 200 begins with a measurement operation 201 where ranging data between the access device 14 and the anchors 12 is gathered. In some embodiments, the ranging data includes one or more measured distances between the access device 14 and each anchor 12. The one or more measured distances for an individual anchor 12 to the access device 14, alone, does not provide an indication of direction. A first localization operation 202 is performed to determine a region of interest where the access device 14 is located with the highest probability. For example, the measured distances from each anchor 12 can be used to define a circle (2D area in the X-Y plane of the coordinate system 30 for example) or sphere (3D volume in the coordinate system 30 for example) around each anchor 12. Intersecting and/or overlapping portions of the circles or spheres around the anchors 12 provide an indication of an approximate, initial location of the access device 14. In some embodiments, data vectorization is used to determine the region of interest 16, 18.

Figure 3:
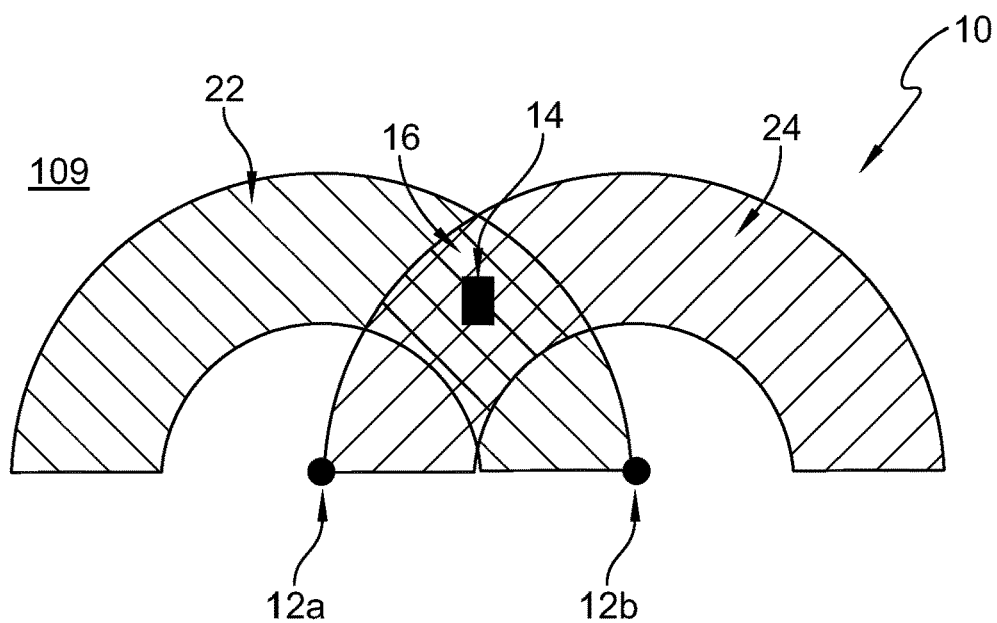
FIG. 3 is a diagrammatic view of the access-control system showing an initial region of interest used in determining a location of the access device on an exterior of the motor vehicle.
Figure 4:
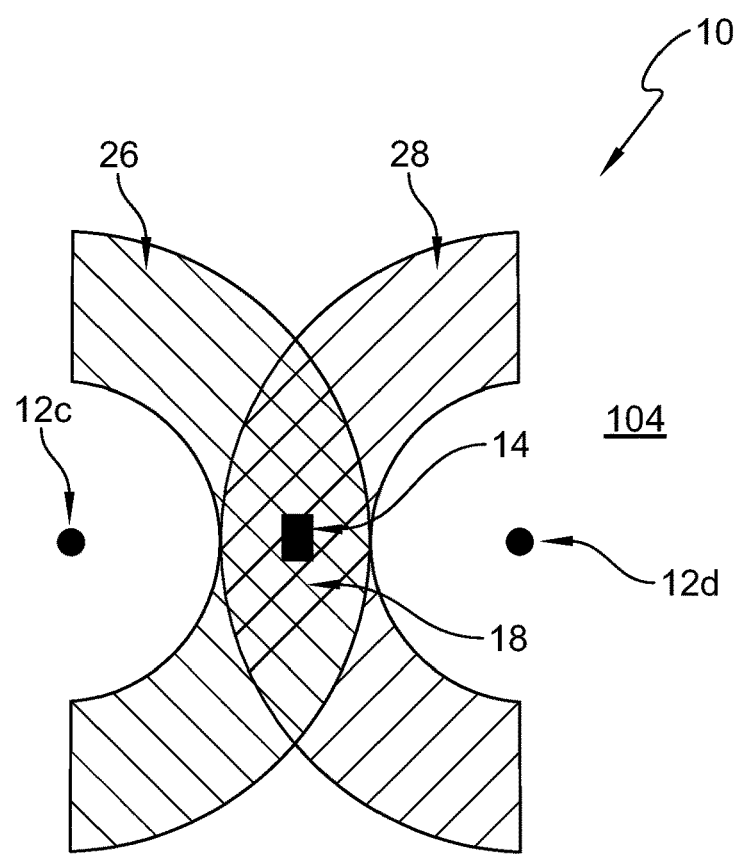
FIG. 4 is a diagrammatic view of the access-control system showing an initial region of interest used in determining a location of the access device on an interior of the motor vehicle.

The initial regions of interest 16, 18 can assume different shapes and volumes depending on the initial location of the access device 14 as suggested in FIGS. 3 and 4. For example, with the access device 14 located in the exterior region 109, overlapping ranging data 22, 24 for two anchors 12a, 12b can be used to determine an initial region of interest 16 that is essentially diamond shaped (across the X-Y plane in the coordinate system 30 for example) as shown in FIG. 3. In another example, with the access device 14 located in the interior 104, overlapping ranging data 26, 28 for two anchors 12c, 12d can be used to determine an initial region of interest 18 that is essentially shaped as a convex lens (across the X-Y plane in the coordinate system 30 for example) as shown in FIG. 4. The different areas and shapes of the initial regions of interest 16, 18 can present difficulties in determining an optimum location of the access device 14.

Figure 5:
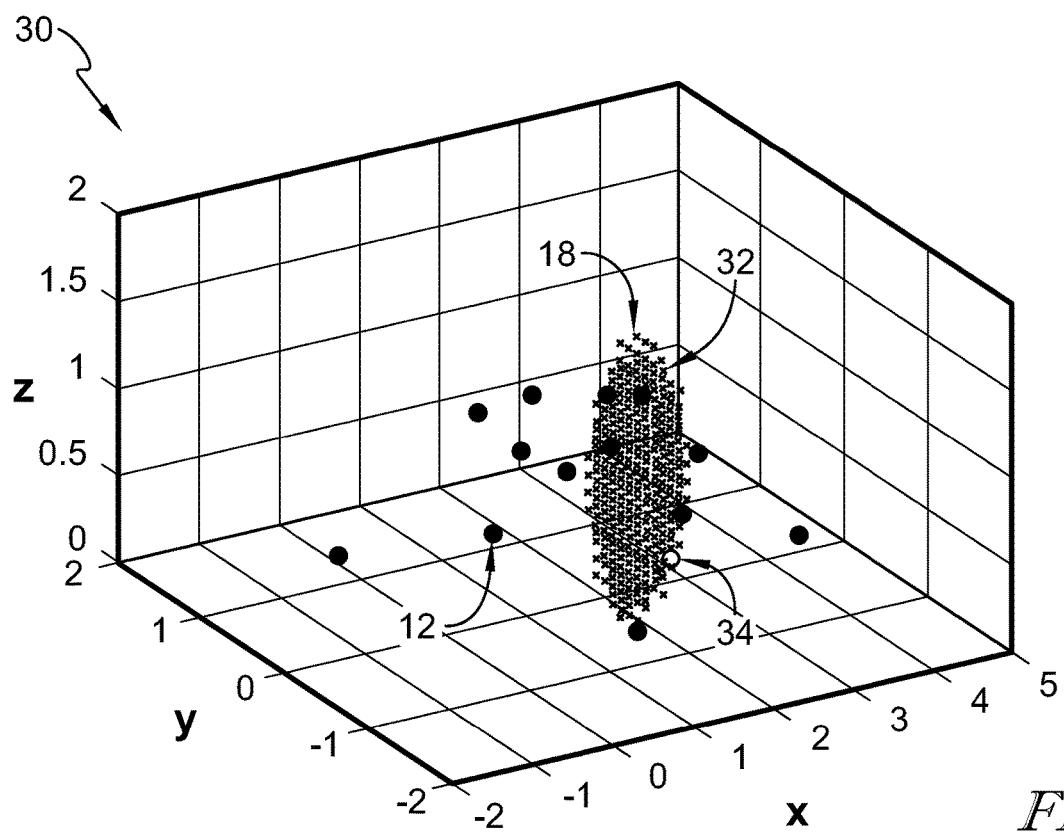
FIG. 5 is a graph showing potential points of interest in an initial region of interest used in determining a location of the access device on an interior of the motor vehicle.
Figure 6:
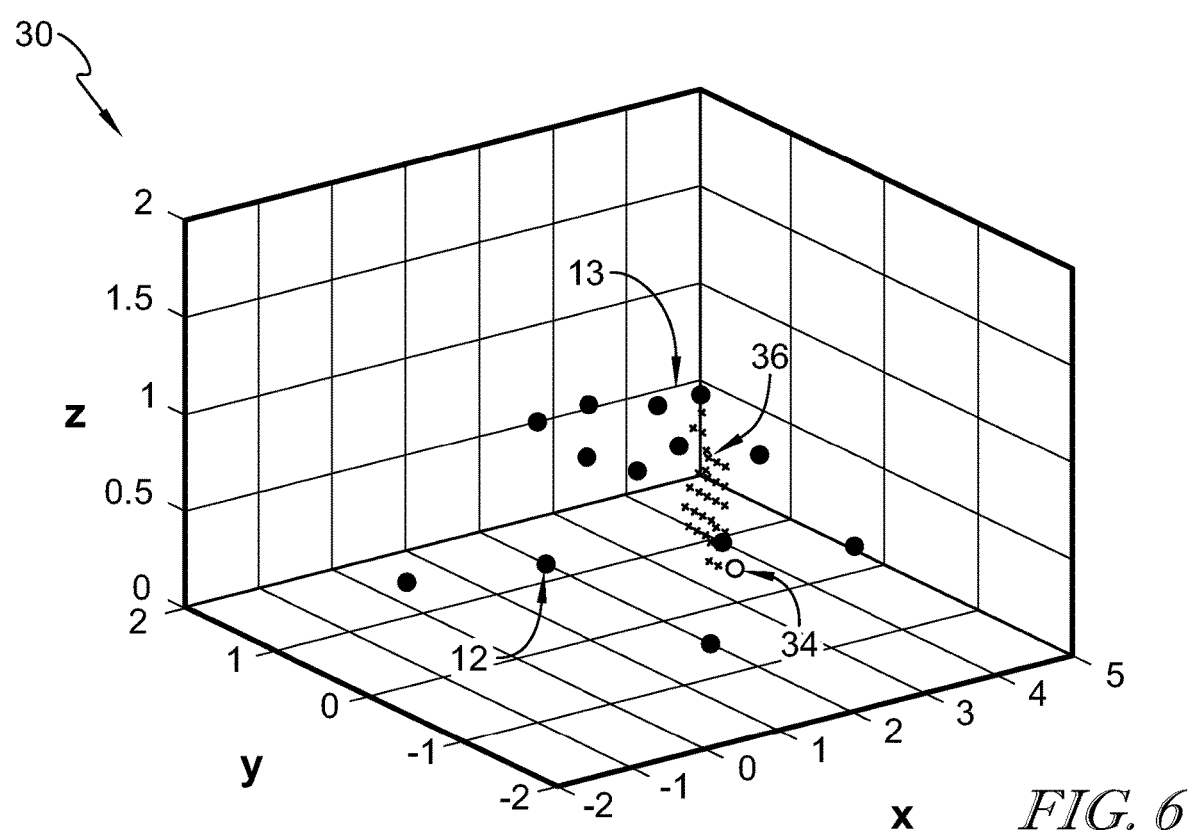
FIG. 6 is a graph showing potential points of interest in an optimized region of interest used in determining an optimum location of the access device on an interior of the motor vehicle.

An optimization operation 203 of the method 200 (shown in FIG. 2) in accordance with the present disclosure filters the ranging data used in determining the initial regions of interest 16, 18 to define optimized regions of interest 11, 13, respectively, as suggested in FIG. 1. For example, an initial region of interest 18 including a plurality of potential locations 32 for the access device 14 in the coordinate system 30 is shown in FIG. 5. This presents a significant amount of information to process for finding the optimum location 34 of the access device 14. An optimized region of interest 13, including a plurality of candidate locations 36 less than the number of potential locations 32 in the initial region of interest 18, is shown in FIG. 6. In some embodiments, the candidate locations 36 are determined based on overlapping points in the ranging data having a lowest error. In some embodiments, the optimization of the initial region of interest 16 can be different than the optimization of the initial region of interest 18 based on the determined initial location of the access device 14 (i.e., inside or outside of the motor vehicle 100) because of the potential differences in shape and volume of the initial regions of interest 16, 18 as suggested in FIGS. 3 and 4.

In some embodiments, the optimization operation 203 is based on correcting the ranging data. For example, the initial region of interest 16, 18 is determined from the ranging data of the anchors 12 to the access device 14. Prime candidate points are selected from within the region of interest and ranging data from the prime candidate points to the beacons is computed. A linear function is built between the original ranging data and the prime candidate ranging data, and the linear function is used to correct the original ranging data. The corrected ranging data can then be processed in finding the optimum location of the access device 14. In some embodiments, the optimization operation 203 is based on searching for a minimum error in the initial region of interest 16, 18, such as using Gradient Descent or Exhaustive Search processes. In some embodiments, the minimum error is determined using the equation:

$$\text{Error}(x, y, z) = \sum_{j=1}^{|nB|} ((x - X_{bj})^2 + (y - Y_{bj})^2 + (z - Z_{bj})^2 - R_j^2)$$

In an operation 204 of the method 200, a determination is made whether the initial location of the access device 14 is inside (i.e., in the interior 104) or outside (i.e., in an exterior region 109) of the motor vehicle 100 based on the optimized region of interest from operation 203 as suggested in FIG. 2. For example, based on the coordinate system 30 and known structures of the motor vehicle 100, it can be determined that an initial location of the access device 14 is outside (i.e., in the exterior region 109) of the motor vehicle 100 when the optimized region of interest 11 is outside of the motor vehicle 100. In some embodiments, the optimized region of interest 11 is spaced apart from the motor vehicle 100 such that the initial location of the access device 14 can be determined with near certainty. In some embodiments, at least a portion of the optimized region of interest 11 overlaps with the interior 104 of the motor vehicle 100, and a determination of the initial location of the access device 14 as being outside of the motor vehicle 100 can be made where a majority of the optimized region of interest 11 is located in the exterior region 109.

In another example, based on the coordinate system 30 and known structures of the motor vehicle 100, it can be determined that an initial location of the access device 14 is inside (i.e., in the interior 104) of the motor vehicle 100 when the access device 14 (shown in phantom) is located in the optimized region of interest 13 inside of the motor vehicle 100. In some embodiments, the optimized region of interest 13 is spaced apart from exterior region 109 of the motor vehicle 100 such that the initial location of the access device 14 can be determined with near certainty.

In some embodiments, at least a portion of the optimized region of interest 13 overlaps with the exterior region 109 of the motor vehicle 100, and a determination of the initial location of the access device 14 as being inside of the motor vehicle 100 can be made where a majority of the optimized region of interest 13 is located in the interior 104. In some embodiments, the optimized regions of interest 11, 13 are compared relative to the ranging data for all anchors 12 to determine in which optimized region of interest 11, 13 the access device 14 is located with highest probability.

A second localization operation 205 in the method 200 may be performed based on the determined initial location of the access device 14 and respective optimized region of interest 11, 13 as suggested in FIG. 2. In an operation 206 of the method 200, the optimum location of the access device 14 relative to the motor vehicle 100 (e.g., in the coordinate system 30) may be determined based on the second localization operation 205. In some embodiments, the first and/or second localization operations 202, 205 can be based on triangulation, trilateration, or multilateration, and use one or more data computation schemes, such as Total Least Squares (TLS), Constrained Total Least Squares (CTLS), and/or Centroid processes among others. In some embodiments, the second localization operation 205 performed when the initial location of the access device 14 is inside the motor vehicle 100 can be different than the second localization operation 205 performed when the initial location of the access device 14 is outside the motor vehicle 100.

The optimum location of the access device 14 can then be used to allow or deny activation of one or more operating systems 106 of the motor vehicle 100. The accuracy in 2D and 3D space can be affected by the number and distribution (X, Y, Z) of anchors 12 in the motor vehicle 100, and the ranging performance of the anchors 12 and/or access device 14. The structure of the body 102 can limit the locations where the anchors 12 can be mounted, and the structures and materials of the motor vehicle 100 can also affect the ranging performance of the anchors 12.

Figure 7:
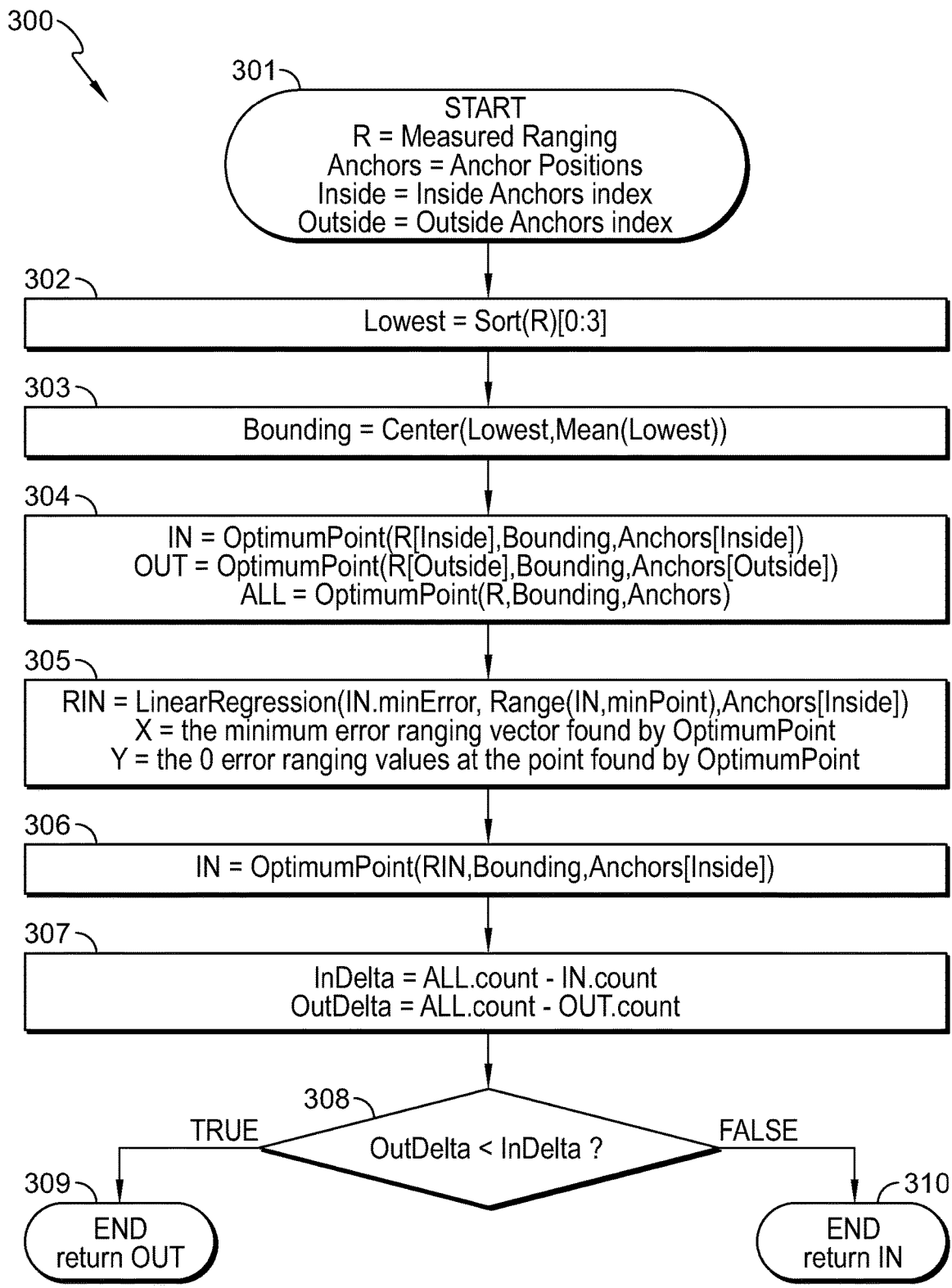
FIG. 7 is a diagrammatic flow chart of an exemplary method in accordance with the present disclosure for determining whether the access device is located on the interior or exterior of the motor vehicle.

An exemplary method 300 for determining the initial location of the access device 14 inside or outside of the motor vehicle 100 is shown in FIG. 7. The method 300 begins with a data identification operation 301 where ranging data, anchor positions, and other definitions are identified for use in determining the initial location of the access device 14. In some embodiments, certain anchors 12 are designated as "outside" anchors and come as "inside" anchors depending on their location on the motor vehicle 100. For example, the anchors 12 closest to the exterior region 109 can be designated as the "outside" anchors and the remaining anchors 12 designated as the "inside" anchors. In a sorting operation 302, the ranging data is sorted down to at least two anchors 12 (three in the illustrative embodiment) with the lowest measured distances to the access device 14. In a bounding operation 303 of the method 300, a boundary is determined where the lowest measured distance is used as a center point and a mean ranging value (e.g., from the three lowest measured distances) define a height and width of the boundary in 2D space or a height, width, and depth of the boundary in 3D space.

Figure 8:
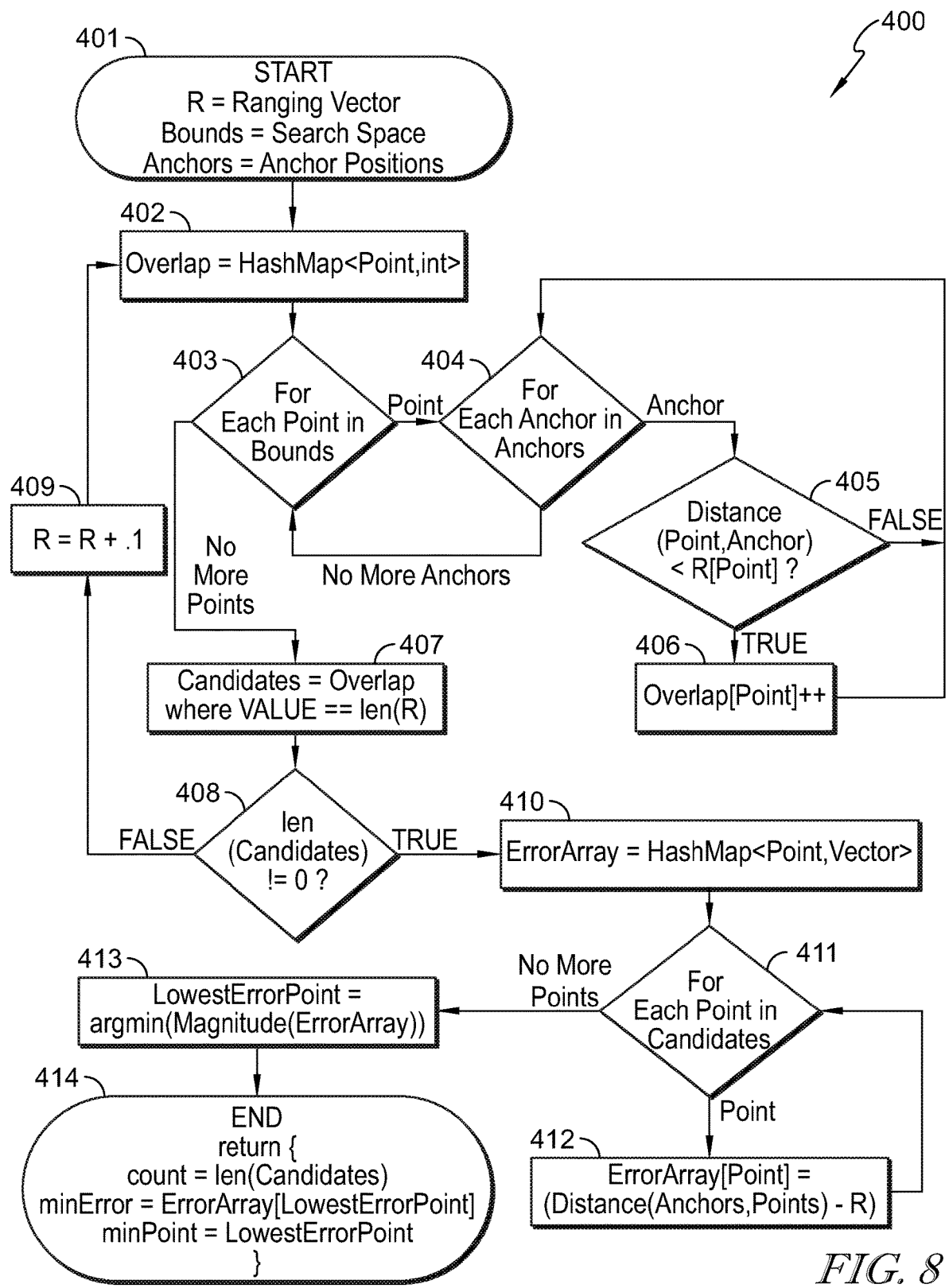
FIG. 8 is a diagrammatic flow chart of an exemplary method in accordance with the present disclosure for processing the ranging data.

The ranging data for all anchors 12, for the designated "outside" anchors, and for the designated "inside" anchors are processed in an operation 304 of the method 300 to define three arrays (i.e., IN, OUT, ALL) as suggested in FIG. 7. An exemplary method 400 for determining the arrays is shown in FIG. 8. The method 400 begins with a data identification operation 401 where ranging data, anchor positions, and other definitions are identified. Candidate point(s) are identified through operations 402-409. The distance between a given point and each selected anchor is compared to an increasing ranging vector, and a counter for the point is increased when the distance is less than the ranging vector. The counter(s) of the candidate point(s) are equal to the number of selected anchors. The minimum error of the candidate point(s) is determined and output in operations 410-413.

As discussed earlier, the arrangement of the anchors 12 can affect the size and orientation of the region of interest depending on whether the access device 14 is inside or outside of the motor vehicle 100 as suggested in FIGS. 1, 3, and 4. This is compounded by the additional structures present inside the motor vehicle 100 as compared to outside of the motor vehicle 100 that can affect the ability of the anchors 12 to gather accurate readings. In the illustrative embodiment, the method 300 includes an error correcting process where the ranging information for the designated "inside" anchors is adjusted in an operation 305 and the array for the designated "inside" anchors is recalculated using the adjusted ranging information in an operation 306 as suggested in FIGS. 7 and 8. The number of candidate point(s) in the IN array and OUT array is each compared to the number of candidate point(s) in the ALL array in an operation 307.

The initial location of the access device 14 as inside or outside of the motor vehicle 100 is determined in operations 308-310 based on the smallest difference in the comparison of the arrays from operation 307. The initial location of the access device 14 as inside or outside the motor vehicle 100 determines the array used for finding the optimum location of the access device 14. For example, in some embodiments, the IN array can be used in determining the optimum location of the access device 14 when the initial location of the access device 14 is determined to be inside the motor vehicle 100. In some embodiments, the OUT array can be used in determining the optimum location of the access device 14 when the initial location of the access device 14 is determined to be outside the motor vehicle 100. In some embodiments, the ALL array can be used in determining the optimum location of the access device 14 when the initial location of the access device 14 is determined to be outside the motor vehicle 100 as the overlapping candidate point(s) is already minimized as suggested in FIG. 3. This minimizes the amount of information being processed for finding the optimum location of the access device 14. One or more additional localization processes can then be performed to determine which of the candidate point(s) is the optimum location of the access device 14.

In some embodiments, a computer program developed in the Python language can be used in accordance with the present disclosure, an example of which is included in the attached Appendix.

Thus, disclosed embodiments provide the technical effect of controlling access to operating systems of a motor vehicle, determining an optimal location of an access device relative to a motor vehicle through search space reduction to maximize accuracy and minimize use of computation resources, and allowing activation of one or more operating systems of the motor vehicle in response to the determined optimum location of the access device being within a predetermined region associated with the one or more operating systems. The disclosed embodiments provide an average localization error of the access device relative to the motor vehicle in 2D space of less than about 18 cm and in 3D space of less than about 30 cm. The systems and methods of the present disclosure also minimize the time required to determine the optimum location of the access device relative to the motor vehicle by minimizing variables affecting the localization process. The disclosed embodiments further allows less accurate (i.e., less expensive) signaling devices to be used in measuring distances between the access device and the motor vehicle while being able to determine the optimum location of the access device.

In illustrative embodiments, the ranging information from a set of anchors (transmitters; e.g., UWB) with known coordinates is used to localize an access device (receiver) relative to a motor vehicle. The anchors are mounted on the interior and exterior parts of the vehicle. The ranging information received from anchors is used to localize the receiver's location using a multilateration algorithm.

In illustrative embodiments, a localization solution minimizes the size of the ROI according to the anchors' configuration and the ranging information, and then the optimum point is located within the ROI. First, a high level localization is performed using interior anchors and exterior anchors. Second, based on the results of step 1, it is determined whether the query point resides inside or outside the motor vehicle. Third, the ROI is optimized and the optimum solution for the localization problem is determined.

In illustrative embodiments, the ROI size (solution space) combined with the high level localization can be used as the main parameter for classifying the interior and exterior regions. The ROI is optimized (e.g., to make the ROI as small as possible) using an error correction scheme. The optimum (X,Y,Z) coordinate of the query point is located in the ROI.

In illustrative embodiments, 14 anchors, including 7 interior and 7 exterior anchors, are used and distributed on the motor vehicle's body.

In accordance with at least some embodiments, an initial region of interest may be identified based on ranging data from at least two anchors that have the lowest measured distances that define a center point of the initial region of interest. Moreover, optionally, a mean ranging value in the ranging data from those anchors may define a height and width of the region of interest. However, it should also be understood that, in accordance with at least some embodiments, this identification of the region of interest may be performed by sub-dividing a search space into sections, e.g., cubes, wherein identification of the region of interest may be repeated while relaxing the ranging error to obtain more convergences among a plurality of anchors. In such an implementation, the section(s) with the most coverage may define the region of interest.

In illustrative embodiments, an access device is used in a passive keyless entry (PKE) and/or passive keyless go (PKG) system of a motor vehicle.

It should be understood that some or all of the methodology explained above may be performed on, utilizing or with access to one or more servers, processors and associated memory. Unless specifically stated otherwise, and as may be apparent from the above description, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the terms "controller" and "processor" may refer to any device or portion of a device that processes electronic data from registers and/or memory to transform that electronic data into other electronic data that may be stored in registers and/or memory.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

APPENDIX

```python
import numpy as np
from time import time

Computing the distance between beacons and global search space by vectorization
def compute_distances_no_loops(X, Y):
    dists = (-2*np.dot(X,Y.T)+np.sum(Y**2,axis=1)+np.sum(X**2,axis=1)[:,np.newaxis])**0.5
    return (dists)

# Optimum function gets the Beacon, RangingVector (R), Train (the search space), ALL is size
# of search space (at the beginning it is None)
def OptimumPoint(Beacon, R, ALL, Train):

################################################################
    # Find the intersection area of the 14 beacons, and for each point in the intersection area compute the ERROR AreaIndex = sum((compute_distances_no_loops(Train, Beacon) < R).T)
    #ErrorValue = (sum((compute_distances_no_loops(Train, Beacon) - R).T))**2
    ErrorValue = sum(((compute_distances_no_loops(Train, Beacon) - R)**2).T)
    ErrorCandidate = ErrorValue[np.where(AreaIndex== len(Beacon))]
    PointCandidate = Train[np.where(AreaIndex== len(Beacon))]

if max(AreaIndex) == len(Beacon):
        ROISize = len(ErrorCandidate)
        MinIndex = np.argmin(ErrorCandidate)
        MinErr = PointCandidate[MinIndex]
        XBound = [min(PointCandidate[:,0]),max(PointCandidate[:,0])]
        YBound = [min(PointCandidate[:,1]),max(PointCandidate[:,1])]
        ZBound = [min(PointCandidate[:,2]),max(PointCandidate[:,2])]
        Bound = [XBound, YBound, ZBound]
        return ([MinErr,ROISize,Bound])
    else:
        Opt = OptimumPoint(Beacon, R+0.1, ALL, Train)
        if np.size(Opt) > 3:
            ALLP = Opt[len(Opt)-1]
            MinErr = ALLP[0];
            ROISize = ALLP[1];
            Bound = Opt[2];
        else:
```

```
            if ALL is None:
                    MinErr = Opt[0];
                    ROISize = Opt[1];
                    Bound = Opt[2];
            else:
                    MinErr = ALL[0];
                    ROISize = ALL[1];
                    Bound = ALL[2];
    return ([MinErr,ROISize,Bound])

####################################
# Linear regression to build the error correction function
def LinearRegression(XX, YY):
    p = np.polyfit(XX, YY, 1)
    Corrected = p[0] * XX + p[1]
    return(Corrected)

###########################################################
# Using the car's dimension in 2D space (Inside/Outside boundary)
def IsInside(P):
    IN = 0
    if (P[0] < 2.8) & (P[0] > 0.2):
        if (P[1] < 0.8) & (P[1]>-0.8):
            IN = 1;
        else:
            IN = 0;
    return(IN)

# Localization with all beacons
###########################################################
# Perform the localization in 3 cases: 1)All beacons, 2)Inside beacons and 3)Outside beacons
# Those two which have similar ROI size + IsInside(P) are used to detect if we are inside or not
# If it is detected as inside we use inside beacons for localization; if outside all of the beacons are used
def run(Beacon,R,InsideIndex,OutsideIndex):
    run_start = time()

R[R<=0] = 100
    # Finding a smaller search space based on 3 closest beacons
    IndR = np.argsort(R)
    AvgR = np.mean(R[IndR[0:3]])
    ThreeBcn = (Beacon[IndR[0:3]])
    CenterPoint = (ThreeBcn[0]+ThreeBcn[1]+ThreeBcn[2])/3
```

```
XLow = max(-10,CenterPoint[0]-AvgR);
XHigh = min(10,CenterPoint[0]+AvgR);
YLow = max(-10,CenterPoint[1]-AvgR);
YHigh = min(10,CenterPoint[1]+AvgR);
ZLow = max(0,CenterPoint[2]-AvgR);
ZHigh = min(2,CenterPoint[2]+AvgR);
X = np.arange(XLow,XHigh,0.1)
Y = np.arange(YLow,YHigh,0.1)
Z = np.arange(ZLow,ZHigh,0.1)

Train = [];
for i in range(0,len(X)):
        for j in range(0,len(Y)):
                for k in range(0,len(Z)):
                        Train.append(np.array([X[i], Y[j], Z[k]]))

Train=np.array(Train)

ALL = OptimumPoint(Beacon, R,None, Train)
MinErr = ALL[0];
ROISize = ALL[1];
Bound = ALL[2];
# Localization with inside beacons - with correction
Inside = OptimumPoint(Beacon[InsideIndex], R[InsideIndex],ALL,Train)
MinErrIN = Inside[0];
ROISizeIN = Inside[1];
BoundIN = Inside[2];
YY = sum(((MinErrIN-Beacon[InsideIndex])**2).T)**0.5
XX = R[InsideIndex];
CorrectedR = LinearRegression(XX, YY)
CorrectedRIN = CorrectedR;
InsideFinal = OptimumPoint(Beacon[InsideIndex], CorrectedRIN,ALL, Train)
MinErrINFinal = InsideFinal[0]
ROISizeFinalIN = InsideFinal[1]
BoundINFinal = InsideFinal[2];
# Localization with outside beacons
PointOut = OptimumPoint(Beacon[OutsideIndex], R[OutsideIndex],ALL, Train)
MinErrOut = PointOut[0]
ROISizeOut = PointOut[1]
BoundOut = PointOut[2]

print("Global Search Time " + str(time() - run_start))
```

```
D1 = abs(ROISize-ROISizeFinalIN)
D2 = abs(ROISize-ROISizeOut)
Estimation = None
if D1 <= D2:
        Yes = IsInside(MinErrINFinal)
        if Yes == 1:
                Boundary = BoundINFinal
                Estimation = MinErrINFinal
                if Estimation[2] >= 1:
                        Estimation[2] = 1;
                        CLASS = 1;
        else:
                Estimation = MinErr
                CLASS = 0;
                Boundary = Bound
else:
        Estimation = MinErr
        CLASS = 0;
        Boundary = Bound
run_end = time()

# print('Bound is: ', Boundary)
return Estimation, Boundary
```

The invention claimed is:

1. A motor vehicle comprising:
a body defining an interior of the motor vehicle with an exterior region surrounding the body;
a plurality of operating systems for controlling operation of the motor vehicle; and
access-control means for locating an access device relative to the motor vehicle by identifying an initial region of interest where the access device is located based on gathered ranging data to a plurality of predetermined positions of a coordinate system, optimizing the initial region of interest based on overlapping points in the ranging data, determining an initial location of the access device as in the interior or in the exterior region based on the optimized region of interest, and determining an optimum location of the access device relative to the motor vehicle in the coordinate system based on whether the access device is determined to be in the interior or in the exterior region to control activation of the operating systems and allowing activation of one or more of the operating systems in response to the determined optimum location of the access device being within a predetermined region associated with the one or more operating systems,
wherein the initial region of interest is identified based on ranging data from at least two predetermined positions of the plurality of predetermined positions having lowest measured distances, wherein a lowest measured distance defines a center point of the initial region of interest, and wherein a mean ranging value in the ranging data from the at least two predetermined positions defines a height and width of the region of interest.

2. A motor vehicle comprising:
a body defining an interior of the motor vehicle;
a plurality of operating systems for controlling operation of the motor vehicle; and
an access-control system configured to control activation of the operating systems, the access-control system comprising:
a plurality of anchors distributed along the body in predetermined positions of a coordinate system;
an access device configured to allow activation of one or more of the operating systems in response to the access device being located in one or more predetermined positions relative to the motor vehicle; and
a controller,
wherein each anchor of the plurality of anchors is configured to measure a distance between the respective anchor and the access device, and the controller is configured to gather ranging data of the measured distances from the plurality of anchors, identify an initial region of interest where the access device is located based on the ranging data, optimize the initial region of interest based on overlapping points in the ranging data, determine an initial location of the access device as in the interior or in an exterior region around the motor vehicle based on the optimized region of interest, and determine an optimum location of the access device relative to the motor vehicle in the coordinate system based on whether the access device is determined to be in the interior or in the exterior region, and
wherein the initial region of interest is identified based on ranging data from at least two anchors of the plurality of anchors having lowest measured distances, wherein a lowest measured distance defines a center point of the initial region of interest, and wherein a mean ranging value in the ranging data from the at least two anchors defines a height and width of the region of interest.

3. The motor vehicle of claim 2, wherein a first set of the plurality of anchors are designated as inside anchors and a second set of the plurality of anchors are designated as outside anchors, and wherein the controller is configured to define a first array of information based on ranging data from the first set of anchors, a second array of information based on ranging data from the second set of anchors, and a third array of information based on ranging data from the plurality of anchors.

4. The motor vehicle of claim 3, wherein the controller is configured to compare the first array to the third array to determine an inside delta, compare the second array to the third array to determine an outside delta, and determined the initial location of the access device based on which of the inside delta and outside delta is larger.

5. The motor vehicle of claim 4, wherein the first array includes a count of overlapping points in the ranging data for the inside anchors, the second array includes a count of overlapping points in the ranging data for the outside anchors, and the third array includes a count of overlapping points in the ranging data for the plurality of anchors.

6. The motor vehicle of claim 3, wherein the controller is configured to define a corrected array of information by performing a linear regression on the first array, and wherein the controller is further configured to compare the corrected array to the third array to determine an inside delta, compare the second array to the third array to determine an outside delta, and determined the initial location of the access device based on which of the inside delta and outside delta is larger.

7. The motor vehicle of claim 6, wherein the controller is configured to determine lowest error information based on a comparison of overlapping points in the ranging data for the inside anchors, and wherein the first array includes the lowest error information.

8. The motor vehicle of claim 6, wherein the corrected array includes a count of overlapping points in corrected ranging data for the inside anchors, the second array includes a count of overlapping points in the ranging data for the outside anchors, and the third array includes a count of overlapping points in the ranging data for the plurality of anchors.

9. An access-control system for a motor vehicle, the access-control system comprising:
a plurality of anchors distributed in predetermined positions of a coordinate system;
an access device configured to allow activation of one or more operating systems of the motor vehicle in response to the access device being located in one or more predetermined positions relative to the motor vehicle; and
a controller,
wherein each anchor of the plurality of anchors is configured to measure a distance between the respective anchor and the access device, and the controller is configured to gather ranging data of the measured distances from the plurality of anchors, identify an initial region of interest where the access device is located based on the ranging data, optimize the initial region of interest based on overlapping points in the ranging data, determine an initial location of the access device as in an interior of the motor vehicle or in an exterior region around the motor vehicle based on the optimized region of interest, and determine an optimum location of the access device relative to the motor vehicle in the coordinate system based on whether the access device is determined to be in the interior or in the exterior region, and wherein the initial region of interest is identified based on ranging data from at least two anchors of the plurality of anchors having lowest measured distances, wherein a lowest measured distance defines a center point of the initial region of interest, and wherein a mean ranging value in the ranging data from the at least two anchors defines a height and width of the region of interest.

10. The access-control system of claim 9, wherein a first set of the plurality of anchors are designated as inside anchors and a second set of the plurality of anchors are designated as outside anchors, and wherein the controller is configured to define a first array of information based on ranging data from the first set of anchors, a second array of information based on ranging data from the second set of anchors, and a third array of information based on ranging data from the plurality of anchors.

11. The access-control system of claim 10, wherein the controller is configured to compare the first array to the third array to determine an inside delta, compare the second array to the third array to determine an outside delta, and determined the initial location of the access device based on which of the inside delta and outside delta is larger.

12. The access-control system of claim 11, wherein the first array includes a count of overlapping points in the ranging data for the inside anchors, the second array includes a count of overlapping points in the ranging data for the outside anchors, and the third array includes a count of overlapping points in the ranging data for the plurality of anchors.

13. The access-control system of claim 10, wherein the controller is configured to define a corrected array of information by performing a linear regression on the first array, and wherein the controller is further configured to compare the corrected array to the third array to determine an inside delta, compare the second array to the third array to determine an outside delta, and determined the initial location of the access device based on which of the inside delta and outside delta is larger.

14. The access-control system of claim 13, wherein the controller is configured to determine lowest error information based on a comparison of overlapping points in the ranging data for the inside anchors, and wherein the first array includes the lowest error information.

15. The access-control system of claim 13, wherein the corrected array includes a count of overlapping points in corrected ranging data for the inside anchors, the second array includes a count of overlapping points in the ranging data for the outside anchors, and the third array includes a count of overlapping points in the ranging data for the plurality of anchors.

16. A method of locating an access device relative to a motor vehicle, the method comprising:

gathering ranging data including measured distances between the access device and a plurality of anchors distributed in predetermined positions of a coordinate system;

identifying an initial region of interest where the access device is located based on the ranging data;

optimizing the initial region of interest based on overlapping points in the ranging data;

determining an initial location of the access device as in an interior of the motor vehicle or in an exterior region around the motor vehicle based on the optimized region of interest; and determining an optimum location of the access device relative to the motor vehicle in the coordinate system based on whether the access device is determined to be in the interior or in the exterior region, wherein the initial region of interest is identified based on ranging data from at least two anchors of the plurality of anchors having lowest measured distances, wherein a lowest measured distance defines a center point of the initial region of interest, and wherein a mean ranging value in the ranging data from the at least two anchors defines a height and width of the region of interest.

17. The method of claim 16, wherein a first set of the plurality of anchors are designated as inside anchors and a second set of the plurality of anchors are designated as outside anchors, and further comprising defining a first array of information based on ranging data from the first set of anchors, a second array of information based on ranging data from the second set of anchors, and a third array of information based on ranging data from the plurality of anchors.

18. The method of claim 17, wherein the first array includes a count of overlapping points in the ranging data for the inside anchors, the second array includes a count of overlapping points in the ranging data for the outside anchors, and the third array includes a count of overlapping points in the ranging data for the plurality of anchors, and further comprising comparing the first array to the third array to determine an inside delta, comparing the second array to the third array to determine an outside delta, and determining the initial location of the access device based on which of the inside delta and outside delta is larger.

19. The method of claim 17, further comprising defining a corrected array of information by performing a linear regression on the first array, wherein the corrected array includes a count of overlapping points in corrected ranging data for the inside anchors, the second array includes a count of overlapping points in the ranging data for the outside anchors, and the third array includes a count of overlapping points in the ranging data for the plurality of anchors, and further comprising comparing the corrected array to the third array to determine an inside delta, compare the second array to the third array to determine an outside delta, and determined the initial location of the access device based on which of the inside delta and outside delta is larger.

* * * * *